US008662783B2

(12) United States Patent
Molenaar

(10) Patent No.: US 8,662,783 B2
(45) Date of Patent: Mar. 4, 2014

(54) PREMIUM PREFORMANCE BALL JOINT AND SYSTEM

(76) Inventor: Kelly Molenaar, Kalamazoo, MI (US)

( * ) Notice: Subject to any disclaimer, the term of this patent is extended or adjusted under 35 U.S.C. 154(b) by 0 days.

(21) Appl. No.: 13/199,642

(22) Filed: Sep. 6, 2011

(65) Prior Publication Data

US 2012/0093573 A1    Apr. 19, 2012

Related U.S. Application Data

(63) Continuation of application No. 12/316,160, filed on Dec. 10, 2008, now abandoned, which is a continuation of application No. 10/050,834, filed on Jan. 15, 2002, now Pat. No. 7,927,035.

(51) Int. Cl.
*F16C 11/00* (2006.01)

(52) U.S. Cl.
USPC .......................... 403/124; 403/126; 403/135

(58) Field of Classification Search
USPC .................. 403/124–126, 134, 135, 138; 280/124.135, 93.512
See application file for complete search history.

(56) References Cited

U.S. PATENT DOCUMENTS

| | | | | |
|---|---|---|---|---|
| 2,559,857 A | * | 7/1951 | Edwards | 403/134 |
| 2,883,221 A | * | 4/1959 | Latzen | 403/126 |
| 2,900,196 A | * | 8/1959 | Nienke | 280/86.756 |
| 2,913,268 A | * | 11/1959 | Booth | 403/127 |
| 2,954,993 A | * | 10/1960 | Scheublein, Jr. et al. | 403/36 |
| 3,061,344 A | * | 10/1962 | Gray et al. | 403/125 |
| 3,103,377 A | * | 9/1963 | Scheublein, Jr. et al. | 403/75 |
| 3,239,256 A | * | 3/1966 | Carter | 403/68 |
| 3,415,551 A | * | 12/1968 | Korecky et al. | 403/126 |
| 3,472,331 A | * | 10/1969 | Baker et al. | 180/254 |
| 3,813,178 A | * | 5/1974 | Herbenar et al. | 403/27 |
| 4,134,701 A | * | 1/1979 | McEowen | 403/34 |
| 4,568,216 A | * | 2/1986 | Mizusawa et al. | 403/143 |
| 4,613,250 A | | 9/1986 | Laucus | |
| 4,666,329 A | * | 5/1987 | Hugelmann | 403/127 |
| 5,435,652 A | * | 7/1995 | Howard | 384/99 |
| 5,564,853 A | * | 10/1996 | Maughan | 403/137 |
| 5,816,731 A | * | 10/1998 | Howard | 403/120 |
| 5,885,022 A | * | 3/1999 | Maughan et al. | 403/135 |
| 6,250,840 B1 | * | 6/2001 | Urbach et al. | 403/135 |
| 6,550,120 B1 | * | 4/2003 | Maughan et al. | 29/401.1 |
| 6,742,955 B2 | * | 6/2004 | Moses | 403/122 |
| 7,927,035 B2 | | 4/2011 | Molenaar | |

FOREIGN PATENT DOCUMENTS

| | | |
|---|---|---|
| DE | 364495 C | 11/1922 |
| FR | 1049045 | 12/1953 |
| FR | 1399174 | 5/1965 |

* cited by examiner

*Primary Examiner* — Victor Macarthur

(57) ABSTRACT

Ball joints, systems in which they are used, and suspension systems in which the ball joint systems are employed. The ball joints, systems and suspension mechanisms are especially useful for racing vehicles in which premium performance is desired. As an additional feature, the products of this invention are especially appreciated because of the ability to quickly and easily replace or change them.

23 Claims, 4 Drawing Sheets

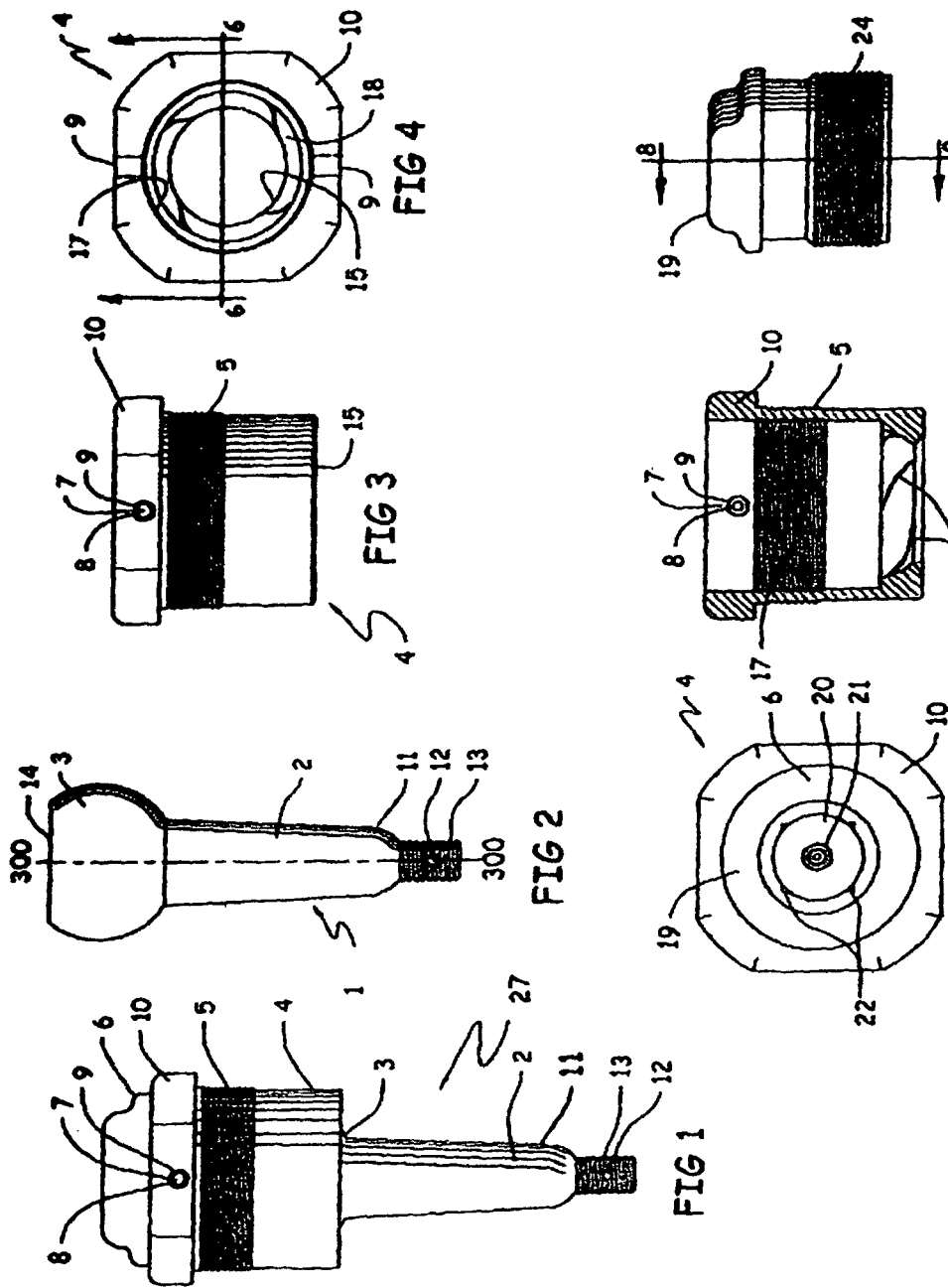

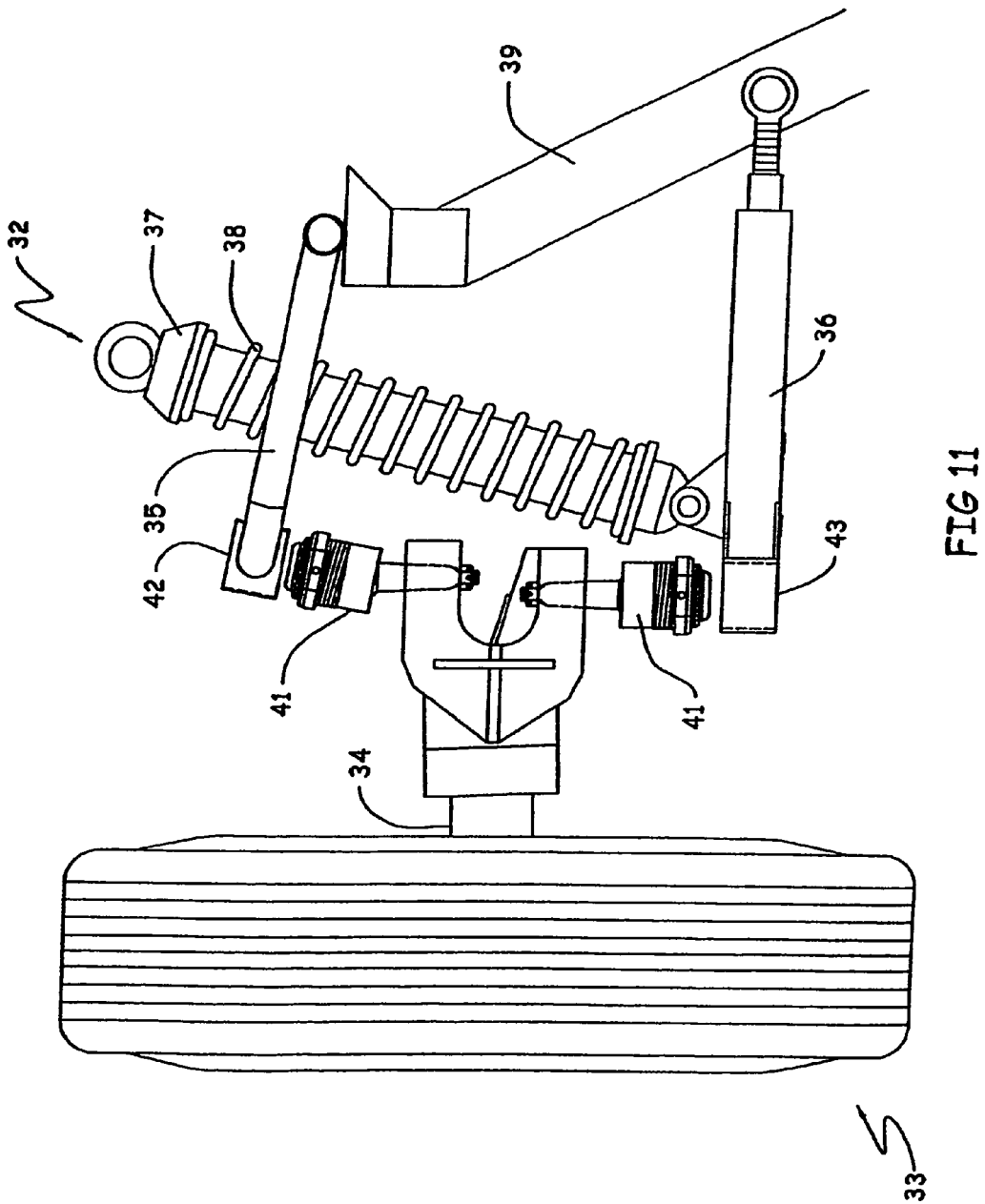

PREMIUM PREFORMANCE BALL JOINT AND SYSTEM

This application is a continuation application of U.S. Ser. No. 10/050,834, filed Jan. 15, 2002, now U.S. Pat. No. 7,927,035, and U.S. Ser. No. 12/316,160, filed Dec. 10, 2008, now abandoned.

The invention disclosed and claimed herein deals with premium performance ball joints, systems in which they are used, and suspension systems in which the ball joint systems are employed. The ball joints, systems and suspension mechanisms are especially useful for racing vehicles in which premium performance is desired. As an additional feature, the products of this invention are especially appreciated because of the ability to quickly and easily replace or change the ball and shaft (ball stud combination) in the ball joints. The ball stud is what is damaged in accidents, and, it wears out first from normal use. Thus, the ability to change the ball stud rather than changing the entire ball joint is a decided advantage of this invention.

Unlike the lower ball joints, upper ball joints do not have the load between the sprung mass of the vehicle and the suspension spring to keep them seated. Most prior art ball joints used in the upper ball joint position use an internal spring over the ball and in the void space above the ball to hold the ball in place. In high cornering situations, the lateral force on the ball joint creates sufficient force to compress the spring and unseat the ball. This problem makes it impossible to maintain the optimum camber in the tire to maximize the tire contact patch on the roadway. This movement also causes minor directional changes in the automobile steering that are detrimental to stability of the automobile. Thus, the premium performance aspect of this invention is based on the fact that prior art ball joints used for the same applications, all have a mechanical means for applying pressure to the ball within the ball joint to accommodate wear as the ball joint is in use, while the ball joint of this invention has no such mechanical means. The lubricants that are commonly used in these types of ball joints provide the pressure required within the inventive ball joint for accommodating the wear of the ball joints of this invention. The result is a ball that has minimal restriction in movement because of the reduction in friction and is therefore essentially "free wheeling" within the housing in which it is contained, thus, providing ease of steering. Original equipment manufactured ball joints of the prior art create inconsistent amounts of resistance to suspension movement, most frequently around twenty pounds, while the ball joints of this invention have less than one pound of resistance. This is important to race drivers, as shock and spring rates are critical to within five pounds. It is not conceivable that automobile handling advantages could be built into the automobile by making small spring and shock rate changes while the ball joints are gradually losing resistance, or "freeing up" as they wear. The ball joints of this invention greatly reduce the "moving resistance target" caused by prior art tight ball joints.

BACKGROUND OF THE INVENTION

It is well known that ball joints and systems employing them are used in front wheel suspension of automotive vehicles. The ball joint lends flexibility for steering the wheels while accommodating changes in angles between the wheel and the suspension members. In conventional ball joints, a pin or shaft on which the wheel is mounted carries a ball, which is rigid with the shaft, the ball being housed in a housing wherein the ball is seated and retained. During both rotation and pivoting of the elongated shaft, the surface of the ball slides over a lining of the housing.

Typically, prior art ball joints are all constructed such that they have an open space or void at the top of the ball, wherein there is typically placed a means for asserting pressure on the top of the ball to accommodate any wear on the ball. Such means are, for example, springs under tension, which are placed on the top of the ball and retained by some kind of insert over the top of the ball. Also known by the inventors herein are ball joints in which the pressure is provided by compressible nylon particles that are situated in the open space and impinge on and essentially surround the exposed top surface of the ball.

All such ball joints require lubrication, and some means is provided to allow for the lubricant to be injected into the housing and onto and around the ball of the ball joint. Further, the ball per se often contains shallow, usually disconnected, channels in which the lubricant can take up residence. These channels help a situation that can occur in the ball joint in which the lubricant, contained within the housing, can block off all air into the housing and create a vacuum within the housing, which provides a lock. This lock is experienced when one tries to put grease into the housing, as the grease gun connector locks onto the grease zerk fitting and cannot be removed. The grooves not only provide a channel for the grease to reach the ball, but they also create vents that allow the grease to enter the ball joint housing and air to escape.

The instant invention eliminates or reduces the above-mentioned problems with ball joints and provides a premium performance ball joint wherein the ball and shaft is easily installed, removable, and easily replaced without having to replace the entire ball joint, and, furthermore, the ball joint system provides premium performance in the operation of automobiles.

The Invention

Thus, this invention deals with novel ball joints, novel systems employing the ball joints, and suspension systems for automotive uses that employ the novel ball joint systems.

More specifically, there is provided a ball joint comprising in combination an elongated shaft having an upper end and a lower end and having a longitudinal axis running through said upper end and said lower end, wherein the elongated shaft has threads on its lower end. There is in addition, a ball rigidly fixed and surmounted on the upper end of the elongated shaft. The ball, at the highest point opposite the attachment of the elongated shaft, has a truncated flat face. There is also a retaining member having an upper surface and a lower end. The retaining member is provided with a lubricating port located in the upper surface of the retaining member. The lubricating port is openly connected to a duct, the duct necessarily providing a passageway for lubricants from the lubricating port to the truncated flat face of the ball. The retaining member is externally threaded on the retaining member lower end.

There is a housing having an outside surface, a middle portion, and a lower end. The housing is internally conformed at the lower end to seat the ball and retain it in the housing, and the seat allows a pivotal movement of the ball about the longitudinal axis of the elongated shaft relative to the housing. The middle portion of the housing is internally threaded to receive the retaining member and the middle portion is externally threaded on the outside surface. Finally, there is a fastening means for fastening the retaining member in the housing.

In another embodiment, there is a combination of the ball joint described just above, and a socket to provide a ball joint system. The socket comprises a cylindrical housing having a wall with an internal surface wherein the internal surface is threaded to receive the housing in it and the socket has a means of attachment for attachment near a terminal end of a carrier for the ball joint system.

Finally, there is an additional embodiment of this invention that is an automotive suspension system incorporating the ball joint systems described just above.

BRIEF DESCRIPTION OF THE DRAWINGS

FIG. 1 is a full view of a ball joint system of this invention that is fully assembled.

FIG. 2 is a full view of the ball and the elongated shaft of this invention.

FIG. 3 is a full view of the housing of this invention

FIG. 4 is a full top view of the housing of this invention without the retaining member in place FIG. 5 is a full top view of the housing of this invention with the retaining member in place.

FIG. 6 is a full cross-sectional view of the housing of FIG. 4 through the lines 6-6 of FIG. 3.

FIG. 7 is a full view of the retaining member of this invention.

FIG. 11 is a schematic drawing of one type of automotive suspension system showing the use of the ball joint systems of this invention.

DETAILED DESCRIPTION OF THE INVENTION

Figure 8:
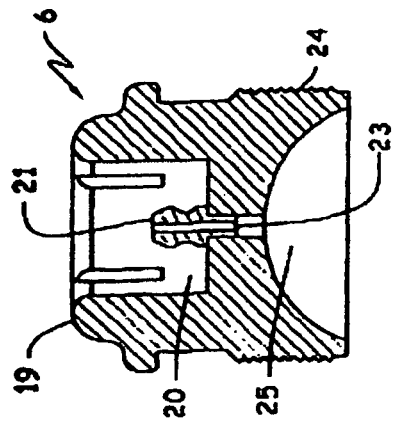
FIG. 8 is a full cross-sectional view of the retaining member of FIG. 7 through the lines 8-8 of FIG. 7.

Turning now to the Figures, and with reference to FIG. 1, which is a full view of a ball joint system 27 of this invention that is fully assembled. There is shown as the components thereof, an elongated shaft 2, and the ball 3 (only a portion of the bottom of the ball is shown therein), the housing 4, with external threads 5, a retaining member 6, and a fastening means 7, which is a set screw 8 set into a threaded (not shown) opening 9, in an upper flange 10 of the housing 4.

It should be noted that the elongated shaft 2 is threaded at its lower end 11, and that there is an opening 12 through the threaded portion 13 of the elongated shaft 2 to accommodate a cotter pin (not shown), or the like, to retain a nut 31 (see FIG. 9), which in turn retains the elongated shaft 2 in a portion of a suspension system that is discussed below. It is contemplated within the scope of this invention to provide ball joints wherein the shafts 2 are provided in various lengths. The reason for the various lengths is that in racing, it is desirable to alter the suspension angles and positions to affect handling, i.e., roll centers, camber gain and other related geometry. Having ball joints with variable length shafts gives the users an option for altering the suspension geometry of the automobile using the ball joints. Currently, racers will change or alter the spindles to make the same geometry changes, and this provides an increased cost, as the spindles are about 6 to 7 times more expensive than the ball joints of this invention.

FIG. 2 is a full view of the combination 1 of the ball 3 and the elongated shaft 2 without the remainder of the components being shown, for clarification. Thus there is shown the ball 3, the elongated shaft 3, a truncated flat surface 14 at the topmost point of the ball 3, and the treaded portion 13 at the lower end 11, along with the opening 12. What is meant by "longitudinal axis running through said upper end and said lower end" is shown by the line 300-300 in FIG. 2, which indicates the principal axis that the ball 3 would revolve around, it being understood that the ball will tilt from this axis within the housing 4 to provide flexibility in the ability of the ball 3 to coordinate with the suspension systems noted infra, and the degree of movement within the housing 4 is limited only by the contact of the elongated shaft 3 with the lower edge 15 of the housing 4, and/or the connection that the elongated shaft 3 has with the suspension system and the wheel 33 shown in FIG. 11.

It should be noted that the preferred combination 1 of ball 3 and elongated shaft 2 is that in which the two are joined as a unitary component. This combination is manufactured from hardened steel or the like to endure the wear that usually accompanies such devices. The truncated flat surface 14 is provided so that there is a space or void 25 (see FIG. 8) formed above the ball 3 when in the housing 4. The space 25 is intended to contain lubricant, namely, a thickened oil or grease which is not shown in this Figure, but which can be any common lubricant known in the art. Filling the void 25 above the truncated surface 14 allows for pressure to be applied to the ball 3, while in the housing 4, and is employed to help seat the ball in the seat 18 (see FIG. 4) provided at the lower end of the housing 4. The pressure created by lubricants inserted into the void 25 is also a means to help adjust the ball 3 in the housing 4 to accommodate for any wear on the ball 3. As far as is known by the inventors herein, this means of accommodating for wear on the ball 3 is not known independently of mechanical means, or as a sole means for providing such pressure.

The housing 4, which houses and seats the ball 3 is shown in FIG. 3. With reference to this Figure, there is shown the threaded exterior surface 5, which inserts into the socket 16, that is described infra, the lower edge 15, which in this Figure is beveled to fit into the bottom of the socket 16, the flange 10 which is configured such that it can be used to turn the housing 4 into the socket 16, and in this Figure, the flange 10 is shown as a hexagon configuration also any convenient configuration that allows the turning of the housing 4 is contemplated within the scope of this invention. The threaded exterior surface 5 is used to attach the housing to the support arm of a suspension system. This means for attaching the housing to the support arm of the suspension system is external threads 5 on the external surface of the middle portion of the housing. In the side surface of the flange 10, there is shown a fastening means 7 for the housing 4, to retain the retaining member 6 in the housing 4, which fastening means 7 is comprised of a simple set screw combination wherein there is shown the threaded opening 9, into which a set screw 8 is inserted and turned down to complete the fastening. The type of fastening means 7 is not critical in this invention, and any fastening means which will secure the retaining member 6 in the housing 4 and which is fairly simple to use, is acceptable.

With reference to FIG. 4, which is a top view of the housing 4, there is shown the flange 10, the fastening means opening 9, in phantom, the internal threads 17 for accommodating the external threads 18 of the retaining member 6, and the seat 18 for the ball 3, which is located near the bottom edge 15 of the housing 4.

Further, with reference to FIG. 5, which is a top view of the housing 4, wherein there is shown the flange 10, therein is situated in the housing 4, a retaining member 6, wherein there is shown the top 19 of the retaining member 6, a concavity 20 in the top 19, and detachedly fixed in the concavity 20, a grease zerk fitting 21. Generally, such grease zerk fittings 21 are threaded and screwed into a threaded opening and that is contemplated within the scope of this invention as well as any convenient means of inserting and fastening the grease zerk fitting 21. Also shown in this Figure are indentions 22, which are indented in the wall of the concavity 20, which indentions 22 are useful for applying a wrench or some other viable means to turn the retaining member 6 in and out of the housing 4. The indentions 22 are not critical to this invention and can be optionally included in the retaining member 6, and can be configured other than as an indention as shown.

Reference should also be made to FIG. 6, which is a cross-sectional view of the housing 4, taken through line 6-6 of FIG. 4, wherein there is shown the flange 10, the opening 9, the set screw 8 tail end, the external threads 5, and the internal threads 17, which accommodate the external threads 24 of the retaining member 6 (see also FIGS. 7 and 8).

With further reference to the retaining member 6, reference should be made to FIG. 7, which is a full view of the retaining member 6, showing the top 19 and the external threads 24. FIG. 8 is a full cross-sectional view of the retaining member 6 through line 8-8 of FIG. 7, wherein, there is shown the top 19, the external threads 24, the concavity 20, and the grease fitting 21. Also shown is the duct 23, which carries lubricant applied to the grease fitting 21 to be carried to the void 25 (see FIG. 8), wherein the ball 3 is shown and wherein the majority of the lubricant resides. Also shown in FIG. 6 are the shallow channels 26 which in the prior art ball joints are typically placed into the ball 2, but which in this invention are placed in the interior of the socket 16. The reason for this placement of the shallow channels 26 is primarily cost, as placing the shallow channels 26 in the socket 16, means that expensive machining does not have to be done in the ball 2, which is the part that is replaced more often.

Figure 9A:
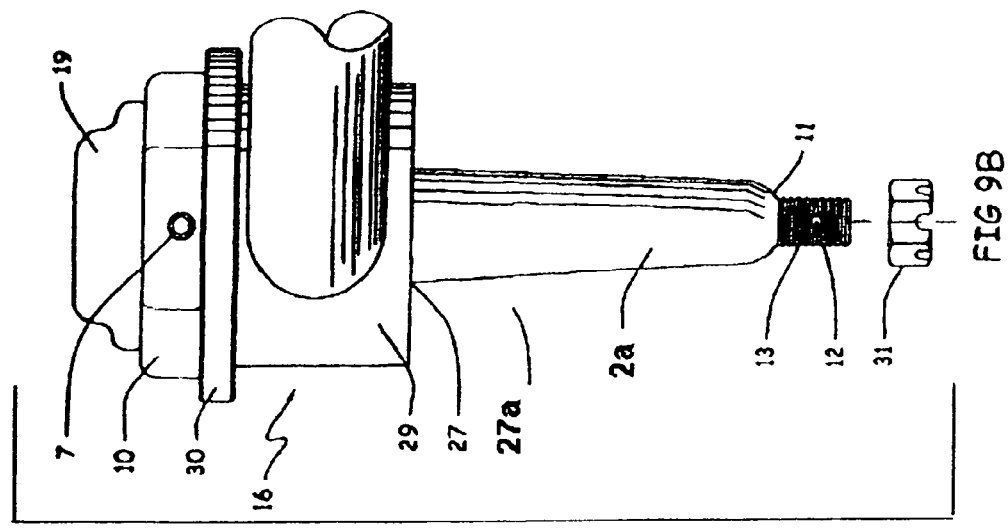
FIG. 9A is a full view of a fully assembled ball joint system of this invention and including the socket.
Figure 9B:
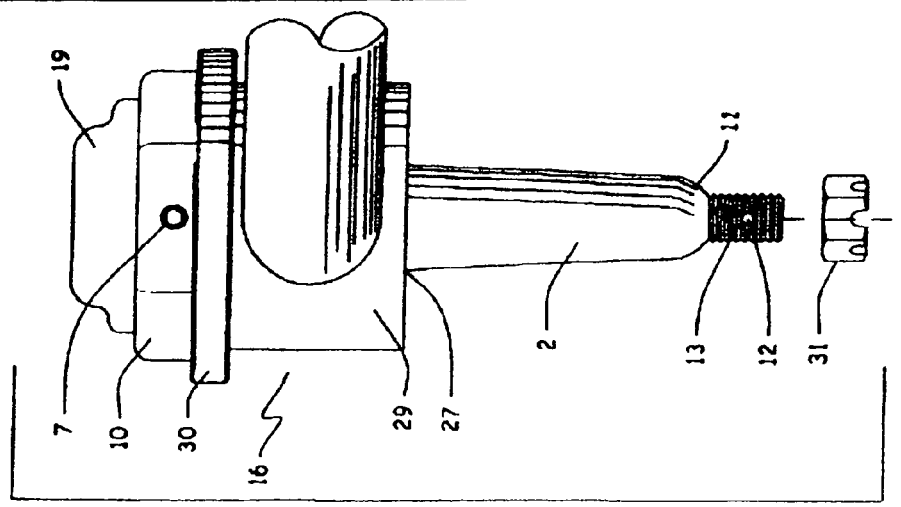
FIG. 9B is a full view of a fully assembled ball joint system of this invention and including the socket.
Figure 10:
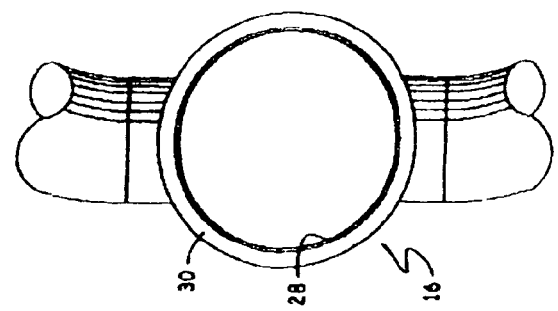
FIG. 10 is a full top view of the socket of FIG. 9.

Turning now to FIG. 9, there is shown a full view of the fully assembled ball joint system 27 wherein components shown therein have like numbers for like components as shown in FIG. 1, except, there is shown in addition, the socket 16, into which the ball joint system 27 is screwed pursuant to the internal threads 28 of the socket 16, and the external threads 5 on the housing 4. The socket 16 is comprised of a hollow cylinder housing, which has a sidewall 29 and an upper rim 30. The socket 16 is fastened securely into the support arms of a suspension system of an automobile or truck, which automotive suspension system is illustrated in the schematic drawing of FIG. 11. The ball joint system 27 can be used for both the upper and lower support arms configuration. The fully assembled ball joint system 27 is then turned into the socket 16 and is secured to the socket 16 by any conventional securing means, such as set screws, retainer rings, or the like. Also shown in association with the ball joint system 27 of FIG. 9 is a threaded nut 31, which can be turned onto the threads 13 of the elongated shaft 2 for attachment to a support means (axle stud) of a wheel of an automobile, and thereafter, the nut 31 is secured thereon by the insertion of a cotter pin, or the like, through the opening 12.

Finally, turning to FIG. 11, there is shown a schematic drawing of one type of automotive suspension system 32, in which there is shown as the main components therein, a fully mounted wheel 33 for the automobile, a support stud (axle) 34 for the wheel 33, wishbone support arms, upper 35, and lower 36, a strut or shock absorber 37, having an surrounding auxiliary spring 38, a support mechanism 39 that is attached to the frame of an automobile (not shown), an upper ball joint system 40, and a lower ball joint system 41, wherein the support arms 35 and 36 do not show as being attached to the lower and upper ball joint systems, 40 and 41, respectively, in order to more clearly show the total configuration of the suspension system. The openings in the support arms 35 and 36 are shown in phantom as 42 and 43, respectively. In actual use, the sockets 16 for both the upper 40 and the lower 41 ball joint systems would normally be inserted in the openings 42 and 43 respectively.

Figure 13:
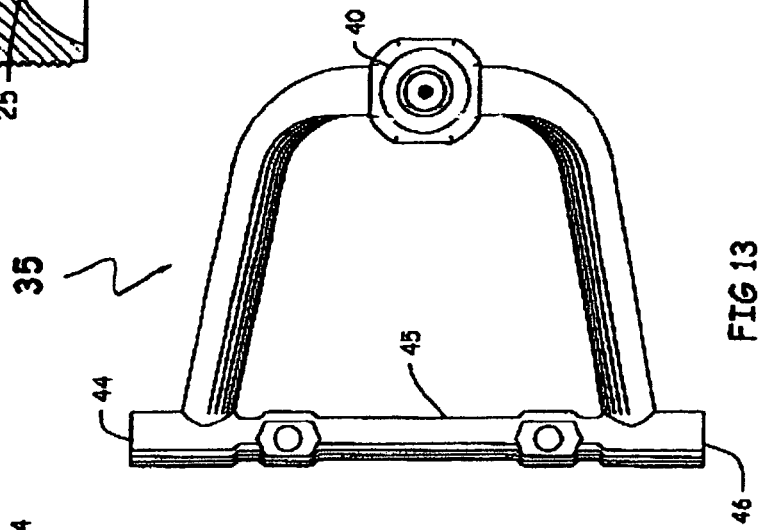
FIG. 13 is a full top view of the wishbone support arm of FIG. 12.
Figure 12:
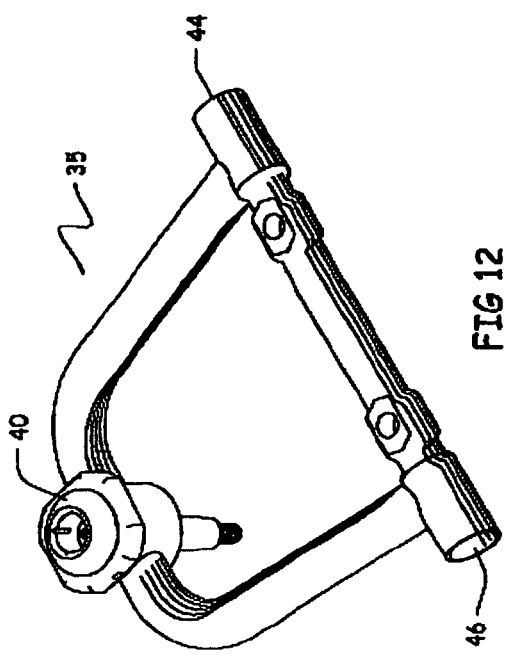
FIG. 12 is a full view in perspective of a portion of the suspension system of FIG. 11, wherein there is shown a wishbone support arm containing a ball joint system of this invention.

FIG. 12 is a full view in perspective of a wishbone support arm 35 or 36 with the ball joint system, either the upper 40, or the lower 41, inserted therein. In addition, FIG. 13 shows a full top view of the wishbone of FIG. 12, wherein the ball joint system 40 or 41 is clearly visible. The support arms 35 and 36 are securely attached to the frame of the vehicle by the bar 45, while the respective ends 44 and 46 are constructed to allow the rotation of the arms 35 and 36 per se to rotate around the bar 45 in an up and down mode for the support arms pursuant to the movement of the wheel 33 and support stud 34 while in use the vehicle is in use. This is also shown in FIG. 13.

What is claimed is:

1. A metal ball joint comprising:
   an elongated shat having an upper end, a lower end, and a tapered portion extending between the upper and lower ends;
   a ball located on the upper end of the elongated shaft, said ball having a continuous curved surface extending upwardly near the tapered portion of the shaft, said ball further having a flat surface located at the upper end of the shaft;
   a housing having an outside surface, an inside vertical wall, an internal thread, and a lower end, said housing further having a curved bearing surface that is integral with and extends from said inside vertical wall, the curved bearing surface engages the curved surface of the ball adjacent the elongated shaft, an opening is formed in the housing for passage therethrough of the elongated shaft but not permitting passage therethrough of the ball such as to permit pivotal movement of the elongated shaft relative to the housing;
   a retainer assembly having an upper portion, a lower portion, a cylindrical non-threaded surface, and a first thread, said retainer further having a curved seat engaging a second portion of the curved surface of the ball adjacent the flat; and
   a threaded locking member having external threads and an opening for receiving a tool that is operable to advance the threaded locking member in and out of the housing, the locking member is threadable to a bore in the housing, the threaded locking member has a surface that impinges upon the cylindrical non-threaded surface of the retainer assembly, the locking member engages the retainer to form a stop to prevent the retainer from disengaging from the housing.

2. The ball joint as claimed in claim 1, wherein the outside surface of said housing further comprises an attachment feature adapted for selective attachment of said housing to a support arm of a suspension system.

3. The ball joint as claimed in claim 2, where said attachment feature further comprises an external thread on the outside surface of the housing, said external thread being capable of attaching the housing to a thread on a support arm of the suspension system.

4. The ball joint as claimed in claim 2, wherein said attachment feature further comprises a flange extending from a portion of the housing that can be secured to the support arm by at least one detachable fastener.

5. The ball joint as claimed in claim 2, wherein said attachment feature further comprises a compression fit of the housing into at least one opening in a support arm.

6. An automotive suspension system wherein there is provided a first ball joint system comprising a first metal ball joint and a second ball joint system comprising a second metal ball joint as claimed in claim 1.

7. The ball joint as claimed in claim 1, wherein the locking member screws tightly against the retainer to affix the retainer relative to the housing.

8. The ball joint as claimed in claim 1, further comprising a lubrication void located between the ball and the retainer, the retainer and the housing being capable of maintaining a seal between the ball and the housing via pressure of lubricant in the lubrication void on the ball.

9. The ball joint as claimed in claim 1, further comprising a zerk, the zerk is capable of permitting the admission of a pressurized lubricant such that the pressurized lubricant exerts a pressure against the retainer and the ball to maintain pressure on the ball to maintain the ball against the seat of the housing.

10. The ball joint as claimed in claim 1, wherein said locking member and retainer are adapted to be selectively separated from said housing allowing said elongated shaft to be removed from said housing, and a replacement shaft to be inserted inside said housing and the retainer to be again secured to said housing.

11. The ball joint as claimed in claim 10, wherein the length of said elongated shaft and said replacement slat are different.

12. The metal ball joint as claimed in claim 1, further comprising an octagon shaped flange, the flange is operable to be engaged by a tool for rotating the joint relative to a suspension member of a vehicle.

13. A metal ball joint for use with a pressurized lubricant, the ball joint comprising:
   an elongated shaft having an upper end and a lower end, said elongated shaft being threaded on the lower end;
   a ball surmounted on the upper end of the elongated shaft, said ball having a curved surface and further having a flat surface on the upper end of the elongated shaft;
   a housing having an outside surface, an inside surface that is planar, a lower end, and a first thread, said housing further having a curved seat extending from the inside planer surface, the curved seat is disposed at the lower end of the housing to seat and engage the curved surface of the ball adjacent the elongated shaft, an opening is formed in the seat for passage therethrough of the elongated shaft but not permitting passage therethrough of the ball such as to permit pivotal movement of the elongated shaft relative to the housing;
   a retainer having an upper surface, a lower end, and an arcuate-shaped non-threaded surface, said retainer having a seat disposed at the lower end thereof to seat and engage another portion of the curved surface of the ball adjacent the flat surface thereof and a lubricating port passing through the retainer, the lubricating port having a passageway, said port permitting the admission of a pressurized lubricant such that the pressurized lubricant exerts a pressure against the flat surface of the ball to maintain pressure on the ball to maintain the ball against the seat of the housing, the retainer being capable of maintaining a seal between the ball and the housing via the pressure of the lubricant on the flat surface of the ball; and
   a fastener having external threads and a port that is operable to receive a tool that can rotate the fastener relative to the housing, the external threads of the fastener engages the first thread of the housing, the fastener includes a portion that biases directly against the arcuate-shaped non-threaded surface of the retainer to form a stop to prevent the retainer from axially disengaging from the housing, the fastener selectively secures the retainer to the housing and permits the retainer to be removed from the housing by removal of the fastener while the housing remains mounted to a vehicle.

14. The ball joint as claimed in claim 13, wherein said housing further comprises an attachment feature adapted for selective attachment of said housing to a suspension member of a vehicle.

15. The ball joint as claimed in claim 13, wherein the fastener is a set screw that is oriented perpendicularly to the arcuate-shaped surface of the retainer.

16. The ball joint as claimed in claim 13, wherein said fastener and retainer are adapted to be selectively separated from said housing allowing said elongated shaft to be removed from said housing, and a replacement shaft to be inserted inside said housing and the retainer to be again secured to said housing.

17. The ball joint claimed in claim 13, wherein the elongated shaft can be removed and replaced with another elongated shaft.

18. A metal ball joint for use as a component of a suspension system, said ball joint comprising:
   a ball stud having an elongated shaft portion with an upper end with a ball, and a threaded portion at a lower end, said ball having a curved surface and a flat;
   a housing having an outside surface with an attachment feature that is operable for selective attachment of said housing to a suspension system, the housing further having a lower end, and an internal thread;
   a curved seat disposed at the lower end of the housing to seat and engage the curved surface of the ball; an opening formed in the first curved seat for passage therethrough of the elongated shaft but not permitting passage therethrough of the ball such as to permit pivotal movement of the elongated shaft relative to the housing;
   a retainer having an upper surface, a circular non-threaded surface, and a lower end, said retainer having an external thread, the external thread being engageable with the internal thread of the housing to trap the ball within the housing, the retainer maintaining a seal between the ball and the housing via pressure of a lubricant on the ball;
   another curved seat adjacent the lower end of the retainer to seat and engage a second portion of the curved surface of the ball; and
   a removable securing member, the securing member includes external threads and an opening that is operable to receive a tool that can rotate the securing member relative to the housing, the securing member further includes a portion that biases directly against the circular non-threaded surface of the retainer to form a stop to prevent the retainer from axially disengaging from the housing, the retainer can be selectively removed from the housing by removal of the securing member, wherein said securing member and retainer are adapted to be selectively separated from said housing allowing said elongated shaft to be removed from said housing, a replacement shaft to be inserted inside said housing and the retainer to be re-secured to said housing, while the housing remains attached to a suspension system.

19. The ball joint as claimed in claim 18, where said attachment feature is a threadlike feature that is on the outside surface of the housing, said threadlike feature being capable of attaching the housing to a support arm of a suspension system.

20. The ball joint as claimed in claim 18, wherein said attachment feature is a flange extending from a portion of the housing that can be secured to a support arm by at least one detachable fastener.

21. The ball joint as claimed in claim 18, wherein said attachment feature is a compression fit of the housing into an opening in a suspension member.

22. The ball joint as claimed in claim 18, further comprising a lubricating port located in the upper surface of the retainer, the lubricating port providing a passageway for delivering pressurized lubricant, said pressurized lubricant exerts a pressure against the flat to maintain pressure on the ball.

23. A metal ball joint assembly for use with a vehicle suspension system comprising:

an elongated shaft having an upper end, a lower end, and a tapered portion extending between the upper and lower ends, the lower end includes threads for connecting to a vehicle;

a ball near the upper end of the shaft, said ball having a continuous curved surface extending upwardly at a point along the shaft, the ball further having a flat surface located at a distal end of the shaft;

a housing having an exterior mounting surface, an internal thread and an arcuate shaped seat, the seat engages the curved surface of the ball, an opening is formed in the housing for passage therethrough of the elongated shaft but not permitting passage therethrough of the ball such as to permit pivotal movement of the elongated shaft relative to the housing, the exterior mounting surface of the housing is mountable to a suspension member of a vehicle;

a retainer body having an upper area, a curved non-threaded surface, a lower area, a thread portion and a curved seat, the curved seat engages the curved surface of the ball near the flat surface; and a stop that is screwed into a bore of the housing, the stop includes external threads and an aperture that is operable to receive a tool that can rotate the stop, the stop further includes a portion that biases directly against the curved non-threaded surface of the retainer body, the stop maintains the retainer and shaft in place relative to the housing when the stop is screwed into the bore, when the stop is unscrewed from the bore, the retainer and shaft can be removed from the housing, the step of removing the stop can be done while the housing remains mounted to a suspension member of a vehicle.

* * * * *

UNITED STATES PATENT AND TRADEMARK OFFICE
CERTIFICATE OF CORRECTION

PATENT NO. : 8,662,783 B2  
APPLICATION NO. : 13/199642  
DATED : March 4, 2014  
INVENTOR(S) : Kelly Molenaar Page 1 of 1

It is certified that error appears in the above-identified patent and that said Letters Patent is hereby corrected as shown below:

In the Specification

Col. 4, Line 7, delete "3" and insert -- 2 -- after "shaft"

Col. 6, Lines 25-26, delete first occurrence of "in use"

In the Claims

Col. 6, Line 30, Claim 1, delete "shat" and insert -- shaft --

Col. 6, Line 44, Claim 1, insert -- , -- after "shaft"

Col. 6, Line 45, Claim 1, delete "but not" before "permitting"

Col. 7, Line 38, Claim 11, delete "slat" and insert -- shaft --

Signed and Sealed this  
Eighth Day of July, 2014

Michelle K. Lee  
*Deputy Director of the United States Patent and Trademark Office*